United States Patent

[11] 3,626,168

[72] Inventor Keith H. Norsworthy
 Bellevue, Wash.
[21] Appl. No. 839,340
[22] Filed July 7, 1969
[45] Patented Dec. 7, 1971
[73] Assignee The Boeing Company
 Seattle, Wash.

[54] MEASURING CORRELATION, AMPLITUDE PROBABILITY AND PROBABILITY DENSITY DISTRIBUTIONS, AND SIGNAL RESPONSE AVERAGING
16 Claims, 8 Drawing Figs.

[52] U.S. Cl................................................ 235/181,
 235/150.53, 324/77 R, 324/77 G, 328/29, 328/75,
 328/154
[51] Int. Cl...................................................... G06f 15/34,
 G06g 7/19
[50] Field of Search.......................... 235/181,
 152, 150.52; 324/77 R, 77 G

[56] References Cited
UNITED STATES PATENTS
| | | | |
|---|---|---|---|
| 3,404,261 | 10/1968 | Lespers et al................. | 235/181 |
| 3,449,553 | 6/1969 | Swan............................ | 235/150.52 |
| 3,514,585 | 5/1970 | Norsworthy.................. | 235/181 |

OTHER REFERENCES
Gatland et al.: A Correlation Function Computer Using Delta Modulation Techniques Inst. of Scient. Instruments 1965 Vol. 2 529– 532
Princeton Applied Research: Signal Correlator Model 100 Correlation function computer Nov. 1966

Primary Examiner—Malcolm A. Morrison
Assistant Examiner—Felix D. Gruber
Attorney—Christensen and Sanborn ABSTRACT: An online real-time instrument for measurement of auto and cross correlation, amplitude probability distribution and amplitude probability density distributions of random analog signals and for measurement of average signal response characteristics. A scanning averager utilized in all the measurements includes capabilities for adapting its time constant to differing clock rates and for selecting its time constant at will for longer and shorter averaging times and for controlling the range of self-adaptivity. The correlation circuitry includes special timing controls for both basic and high frequency modes and combines analog and digital circuit design. The latter is accompanied by provision of a synchronized pseudorandom noise source to assure uniform probability density distribution for the full scale range of the input signal. Conservation of circuitry is achieved through use of the same circuitry for the different measurements of which the instrument is capable. Special logic is included for enhancement of amplitude probability distribution measurements.

3,626,168

MEASURING CORRELATION, AMPLITUDE PROBABILITY AND PROBABILITY DENSITY DISTRIBUTIONS, AND SIGNAL RESPONSE AVERAGING

CROSS-REFERENCE TO RELATED APPLICATION

Reference is made herein to the copending application of the inventor, titled "MULTICHANNEL CORRELATOR SYSTEM," Ser. No. 552,994, filed Apr. 4, 1966, now U.S. Pat. No. 3,514,585.

BACKGROUND AND SUMMARY OF THE INVENTION

This invention relates to instruments for random signal analysis, and more particularly to a single instrument capable of measuring auto and cross correlation functions, amplitude probability distribution (APD), amplitude probability density distribution (APDD) and signal response averaging (sometimes referred to as computation of average transients). In addition, the invention relates to an improved scanning averager, utilized in each of the above-mentioned measurements, capable of adapting its time constant of different operation speeds (clock rates) and including a feature for selection of the effective time constant to control the averaging time and the self-adaptivity of the averaging circuits, without changing the circuit values. The invention also encompasses certain specific improvements in time correlation computers, particularly in the timing control thereof to effect improved operation. Other features of the invention will become apparent from the disclosure of the preferred embodiment which, it will be recognized, can be modified in various ways within the scope of the various principles involved.

Over the past decade the evolutionary development of equipment and techniques for analysis of random signals has steadily decreased instrument complexity and improved measurement accuracy to a point where errors are now usually attributed to insufficient input data rather than instrument imperfections. Various approaches to correlation measurements have been previously taken, especially in relation to the techniques for obtaining signal delays. These included the use of a magnetic recording medium with means for varying the positions of read and write heads. Typically, delay values were processed one at a time, and the correlation results were plotted or displayed for interpretation. Multichannel instruments for substantially simultaneous computation of different correlation coefficients were then developed, as were instruments utilizing electronic sample and hold circuitry for deriving the signal delays required for correlation. Instrument performance characteristics were limited, however, by inaccuracies in the multipliers, low-speed sample and hold circuits, and statistical variances arising from low product rates.

This inventor developed improved multichannel correlation circuitry which, by virtue of a unique cross multiplication of signal values appropriately staggered in time, was able to provide on a practical basis a larger number of simultaneously computed correlation coefficients for continuous display of the correlation function in real time. The design disclosed in the above-mentioned copending application permitted the construction of an economical, compact and easily maintained system for real time display of the correlation function.

It became evident, however, that additional efforts were required to decrease the statistical variances that occur from low product rates and to reduce the cost of construction of a multichannel instrument having large amounts of precomputation (bias) delay. It also became evident that since correlator applications involve random phenomena, the instrument could advantageously include additional capabilities for statistical measurements including amplitude probability statistics, and that for relatively little cost these capabilities could be added to a correlation instrument including the appropriate features.

Through evolutionary stages of circuit development the present random signal analyzer was developed which provides the features and advantages mentioned heretofore and also provides the capability of computing averaged transients or the averaged response of a system to repeated stimuli.

The greatest disadvantage of prior systems which is overcome by the present system is the low product rate characteristic of such prior systems. The product rate per correlation coefficient in the aforementioned multichannel instrument of the inventor was, for example, $1(296_{max})$. Low product rates produce substantial statistical variance in the display correlation function, particularly when large precomputation (bias) delays are employed. The high product rate provided by this invention effects substantial improvements in the quality of the correlation measurements achieved while allowing a less costly implementation of the precomputation delay than has been possible heretofore.

In general, the statistical accuracy of a correlator is dependent upon the product rate applicable to each correlation coefficient output channel. If the frequency at which the samples and products are obtained is too high, then the products averaged in each output channel will be highly correlated, one to the next, so that they do not provide statistically independent data for the averaging process. Of course, if the sampling rate is too low, then insufficient signal information is derived for the averaging process.

A product rate (per correlation coefficient) equal to the reciprocal of 10 times the delay increment $\Delta\tau$ virtually as effective as all higher product rates, because the delay increment $\Delta\tau$ is typically selected small enough to display the correlation function with acceptable delay resolution. Under this condition products taken with less separation than $10\Delta\tau$ are not statistically independent and do not contribute independently to the averaged correlation coefficient.

It should be noted that despite the Nyquist sampling theorem, product rates for each correlator output channel of less than half the input signal bandwidth are acceptable. The correct interpretation of the sampling theorem for the correlator is that $\Delta\tau$ should be less than one-half the reciprocal of the input signal bandwidth.

In addition to achieving a high product rate or correlation coefficient and the other objectives mentioned, the instrument also achieves certain more specific purposes. For example, by use of both analog and digital circuit design and fast circuit components, a delay increment $\Delta\tau$ as small as 0.1 microseconds is provided.

The provision of the pseudorandom noise source whose randomness is synchronized with the instrument cycle enables the use of simple digital circuit design without compromising measurement linearity.

In accordance with the invention, the correlation circuitry of the instrument successively derives samples of first and second signals at different sampling rates and stores sampled values of the signal in a multiple output storage means. During each instrument cycle, each of the stored values of the first signal is multiplied by each of the values of the second signal. Hence the Cartesian product of the derived samples of first and second signals is obtained sequentially by cross multiplication of the stored values of the one signal by each of the values of the second signal. As the products of first and second signal values are obtained, they are applied to separate averaging circuits by a scanner which enables the sharing of each of a plurality of multipliers among several averaging circuits. The scanner multiplexes the product signals to the individual averagers so that each receives only those corresponding to a given delay value $\tau$. A suitable nondestructive readout scanner which need not be coordinated or synchronized with the aforementioned switching circuitry, enables real time display of the averaged product signal values, which comprise the correlation function. In the preferred form of the instrument, digital samples of one signal and analog samples of the other signal are derived. Both positive and negative values of the analog samples are provided, and the multiplication process is achieved by applying to the averaging circuits positive or negative values of the analog samples in accordance with whether respective stored digital samples of the other signals are ones or zeros.

In the basic mode of operation of the correlator the analog samples are taken at a higher rate than the digital samples to establish an appropriate array of delays $\tau$. In the high-frequency mode the analog and digital samples are taken at slightly different rates and the iteration caused by the phase difference enables production of a large array of delays $\tau$ with small spacings $\Delta\tau$ therebetween.

For amplitude probability distribution (APD) measurements much of the same circuitry is utilized, and means are provided for switching out of the system those circuits which are not utilized in this mode and into the system those circuits which are utilized. The input signal is compared in a digital comparator (also utilized in the correlator circuitry) with a ramp signal which is synchronized with the cycling of the scanning averager. Each averaging circuit in the scanning averager receives a positive or negative voltage signal, depending upon whether the input signal is greater or less than the ramp signal value to which that averaging circuit corresponds. Each averaging circuit thus derives a signal representing the probability of the input signal exceeding a particular ramp signal value, and their outputs collectively provide the amplitude probability distribution for real time display. A special enhancement feature is provided by means of which the amplitude probability distribution is weighted to improve its representation throughout the range of ramp signal values.

For measurement of the amplitude probability density distribution (APDD) two digital comparators are utilized, in one of which the input signal is compared with a fixed reference level and in the other of which it is compared with the ramp signal plus a voltage reference. The comparator outputs are coupled to an exclusive OR circuit which provides a signal indicating whether the input signal is greater or less than the fixed reference and less than the sum of the incremental signal and the ramp signal. The digital indication thus derived is applied to the averaging circuits in synchronism with the ramp signal voltage, whereby the outputs of the averaging circuits collectively represent the amplitude probability density distribution of the input signal.

When the instrument is operated as a signal averager (computer of average transients) still other special circuitry is switched into operation while that applicable only for correlation and amplitude probability measurements is switched out of the system. In addition to the input signal representative of the response of a system whose characteristics are being measured, an additional input signal is applied to the instrument for coordination with the stimulus applied to the measured system. In response to each stimulus trigger, the scanning averager applies the input signal to the averagers successively whereby each averaging circuit averages repeated responses of the measured system for a particular time following applications of the stimulus. The averaging circuit outputs collectively provide a representation of the average transient response of the measured system.

In the scanning averager each averaging circuit includes a special sample and hold capacitor which is much smaller than the capacitor included in the RC-averaging filter circuit and which enables the scanning averager to automatically adapt its time constant to differing clock rates. If the clock rate, and hence the scanning rate, is high then the special input capacitor in effect shields the averaging filter from the operation of the input scanning switch so that the filter circuit does not know that it has been disconnected during a portion of the cycle. For lower scanning rates, however, the voltage on the input capacitor tends to decay and reach an equilibrium with that in the filter circuit. For different clock rates, the decay process, or the progression of the averaging circuit toward an equilibrium state, progresses to different degrees. Since the effective time constant of each circuit is dependent upon the amount of time during which it is connected to the system by the scanner, the input capacitor causes the effective time constant to adapt to differing degrees for different clock rates.

In addition, special timing control circuitry is included for selection of the effective time constant by controlling the dwell time of the scanner input switches. This feature is effective either together with or independent of the adaptivity feature.

These and other features, objects and advantages of the invention will be more fully understood from the following description of the preferred embodiment of the invention, as illustrated in the accompanying drawings and diagrams.

DESCRIPTION OF THE PREFERRED EMBODIMENT

Figure 1:
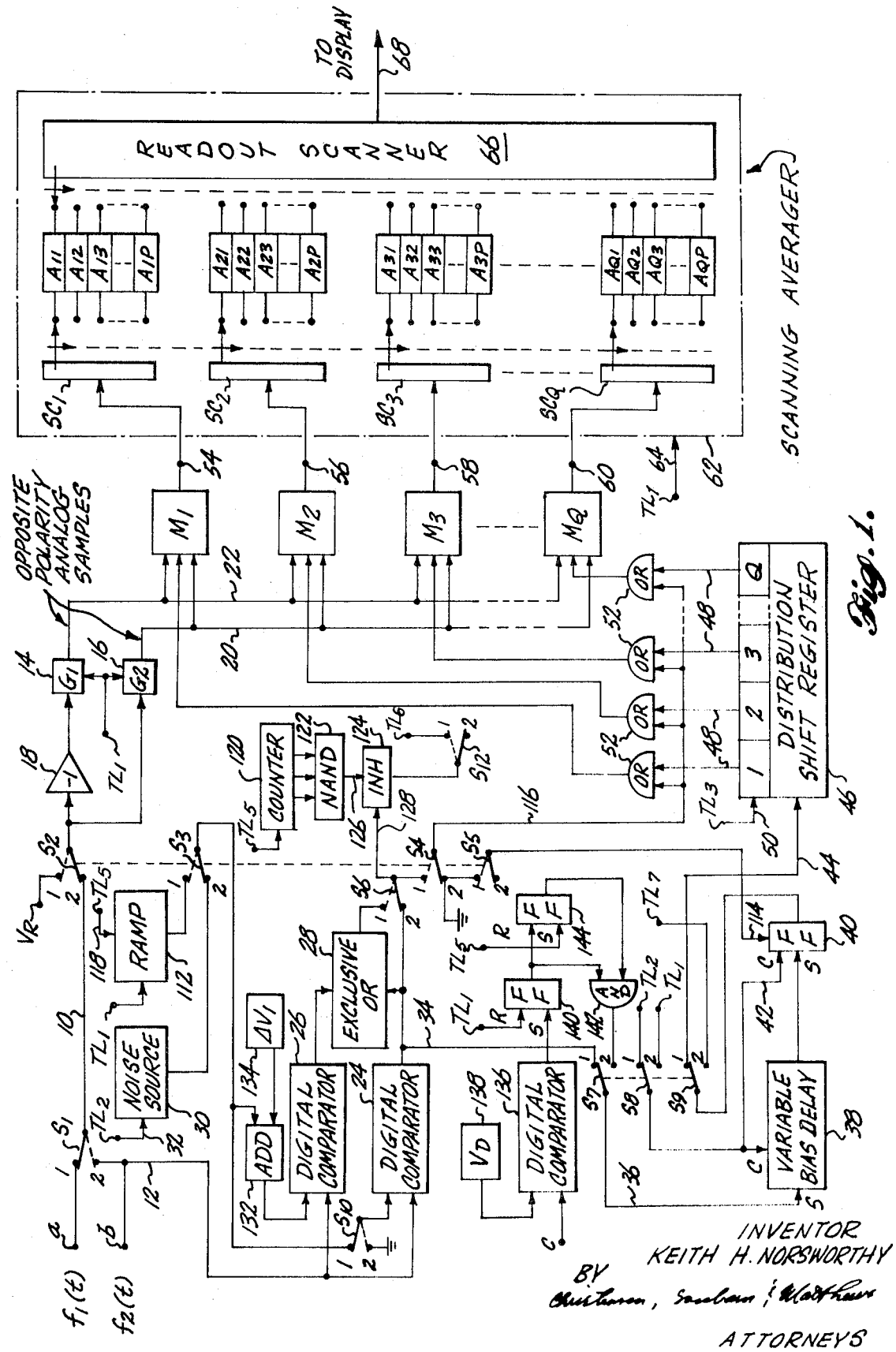
FIG. 1 is a block diagram of a random signal analyzer according to the invention, including circuitry for selecting different modes of operation for computation of auto and cross correlation functions, amplitude probability distribution, amplitude probability density distribution, and averaged signal responses.

The preferred multipurpose random signal analyzer instrument according to the invention is designed to be contained within a single cabinet with switches on the front panel for selection of the different modes of operation. The positions of switches $S_1$ to $S_{13}$ are shown in table I in the Appendix. The instrument is designed primarily as a correlator, with secondary capabilities of random signal analysis by computation of APD, APDD and signal averaging. Correlation analysis will be discussed first, and the switch positions shown in the drawings are for correlation measurements.

Correlation Measurements

For cross correlation first and second electrical signals $f_1(t)$ and $f_2(t)$ are applied at first and second input terminals $a$ and $b$, with switch $S_1$ in position 1 (up). For autocorrelation the signal is applied at terminal $b$ and switch $S_1$ is turned to position 2 (down). The specialized case of autocorrelation will be understood from the following discussion based on cross correlation with switch $S_1$ in position 1.

In the first input channel signal $f_1(t)$ is applied through line 10 and switch $S_2$ in position 2 to a first analog sample and hold circuit 14 after being inverted in inverter 18. It is also applied to a second analog sample and hold circuit 16 to supply opposite polarity analog samples to multipliers $M_1$, $M_2$, $M_3$...$M_q$ on lines 20 and 22. The sample and hold circuits operate under control of a waveform ($T_1$ or $T_1'$) applied to sample $f_1(t)$ at intervals $\Delta\tau$ or multiples thereof.

In the second channel signal $f_2(t)$ is applied on line 12 to first and second digital comparators 24 and 26, whose respective outputs are coupled to exclusive OR-circuit 28. However, the second digital comparator 26 and the exclusive OR-circuit 28 are not used in the correlation mode of operation of the instrument, with switch $S_8$ in position 2. (Switch $S_{12}$ is in position 2 to also exclude the operation of special circuitry leading thereto, described hereinafter, from operation in the correlation mode).

Digital comparator 24 compares signal $f_2(t)$ with either of two references. With switch $S_{10}$ in position 2, $f_2(t)$ is compared with ground in what is termed the "relay" mode. With switch $S_{10}$ in position 1, in what is termed the "linear" mode, $f_2(t)$ is compared with a reference signal provided by a pseudorandom noise source 30 through switch $S_3$ (in position 2). It was shown by Jespers, Chu and Fettweis, in "A New Method to Compute Correlation Functions," *IRE Transactions on Information Theory*, Vol. IT–8, No. 5, Sept. 1962, pp. 106, 107 and 136, that correlation measurements can be performed, without sacrificing statistical accuracy, using quantized signals in both input channels in a so-called "zero-crossing" correlator, provided the quantizing is performed by comparison with auxiliary signals which have uniform probability distributions across their full range.

Princeton Applied Research Corporation (PAR) has constructed a correlation function computer utilizing a quantizer which compares the analog input signal with a sawtooth waveform and samples the output of the quantizer at a random rate. In the PAR correlator a very high degree of isolation must be maintained between the quantizer and the frequency of the clock which controls the sampling to assure that the sampling is random. That is, the approach has been to assure that asynchronism is maintained between the randomness control and the clock frequency, in order to meet the condition established by Jespers et al. that the auxiliary signals be uncorrelated to the input signals.

The opposite approach is taken in the present correlator, wherein a simpler pseudorandom noise source 30 is purposely synchronized with sampling rate. The random noise source 30 comprises a shift register generating a pseudorandom code, of the maximal length sequence type, which by simple binary digital-to-analog conversion gives a uniform probability distribution over the full scale range of the input signal. Instead of providing circuitry and shielding to assure isolation and asynchronism of the code signal with the cyclic operation of the correlator, according to this invention a timing control waveform $T_2$ (or $T_2'$) from terminal $TL_2$ is applied at input terminal 32 which, as will be explained hereafter, cycles the noise source so as to produce the desired uniform probability distribution over the averaging interval of the instrument. The length of the noise source shift register sequence is such that the sequence is recycled a number of times within each averaging time of the system.

While the zero-crossing correlator described by Jespers et al. quantized both input signals, the present correlator combines digital and analog circuit design to achieve still greater accuracy on a practical basis. The output of digital comparator 24, namely signal $f_2(t)$ quantized with respect to either ground or the synchronized pseudorandom noise signal, is applied to a variable bias delay circuit 38 through lines 34 and 36 with switches $S_7$ to $S_9$ in position 1. Bias delay circuit 38 is a variable length shift register which enables a selectable amount of precomputation (bias) delay to be employed in a known manner to shift the correlation function display to nonzero starting points selectable in steps of $10\Delta\tau$ up to $5,120\Delta\tau$ in the preferred instrument. To simplify the discussion herein, it will be assumed that the bias delay is zero, and that the quantized second input signal $f_2(t)$ is applied directly to flip-flop circuit 40 which is coupled to the output of bias delay circuit 38.

In effect, flip-flop 40 samples the output of digital comparator 24 under control of a timing waveform ($T_2$ or $T_2'$) from terminal $TL_3$ applied to its control terminal 42 through switch $S_8$. The quantized samples thus derived are applied through switch $S_9$ and line 44 to a distribution shift register 46 having Q stages and parallel output terminals 48. The register is shifted under control of a timing waveform ($T_3$ or $T_3'$) applied at control terminal 50. The quantized samples of $f_2(t)$ as they are shifted through successive stages of the shift register 46 are distributed in parallel to multipliers $M_1$, $M_2$, $M_3$...$M_Q$ through OR-circuits 52. A ground reference voltage or "zero" is applied to the other input of each OR circuit through switch $S_4$ in position 2.

Multipliers $M_1$...$M_Q$ are one-bit multipliers which provide at their respective output terminals 54, 56, 58...60 positive or negative analog samples of the first input signal $f_1(t)$ in accordance with whether the applied quantized sample of $f_2(t)$ is a one or a zero. These product signals are applied to the respective inputs of the scanning averager 62.

Scanning averager 62 operates under control of a timing waveform ($T_1$ or $T_1'$) from terminal $TL_1$ applied to control terminal 64, which synchronizes the scanner operation with the sampling of the input signals as will be described. In the correlation mode the product signals from the respective multipliers are applied in parallel to Q sets of averagers, each set consisting of P separate averaging circuits: $A_{11}, A_{12}...A_{1P}$; $A_{21}, A_{22}...A_{2P}$ Q1, $A_{Q2}...A_{QP}$.

These separate sets of averaging circuits are scanned in parallel in the correlation mode so that input scanners $SC_1$, $SC_2$, $SC_3$...$SC_Q$ apply respective product signals to the first averaging circuit in the corresponding sets simultaneously, then to the second averaging circuit, then to the third, and so forth. The readout scanner 66 operates independently of the input scanners and provides nondestructive readout of the averaged product signals in the respective averaging circuits for real time display on an oscilloscope or other suitable instrument coupled to the display output 68.

Figure 2:
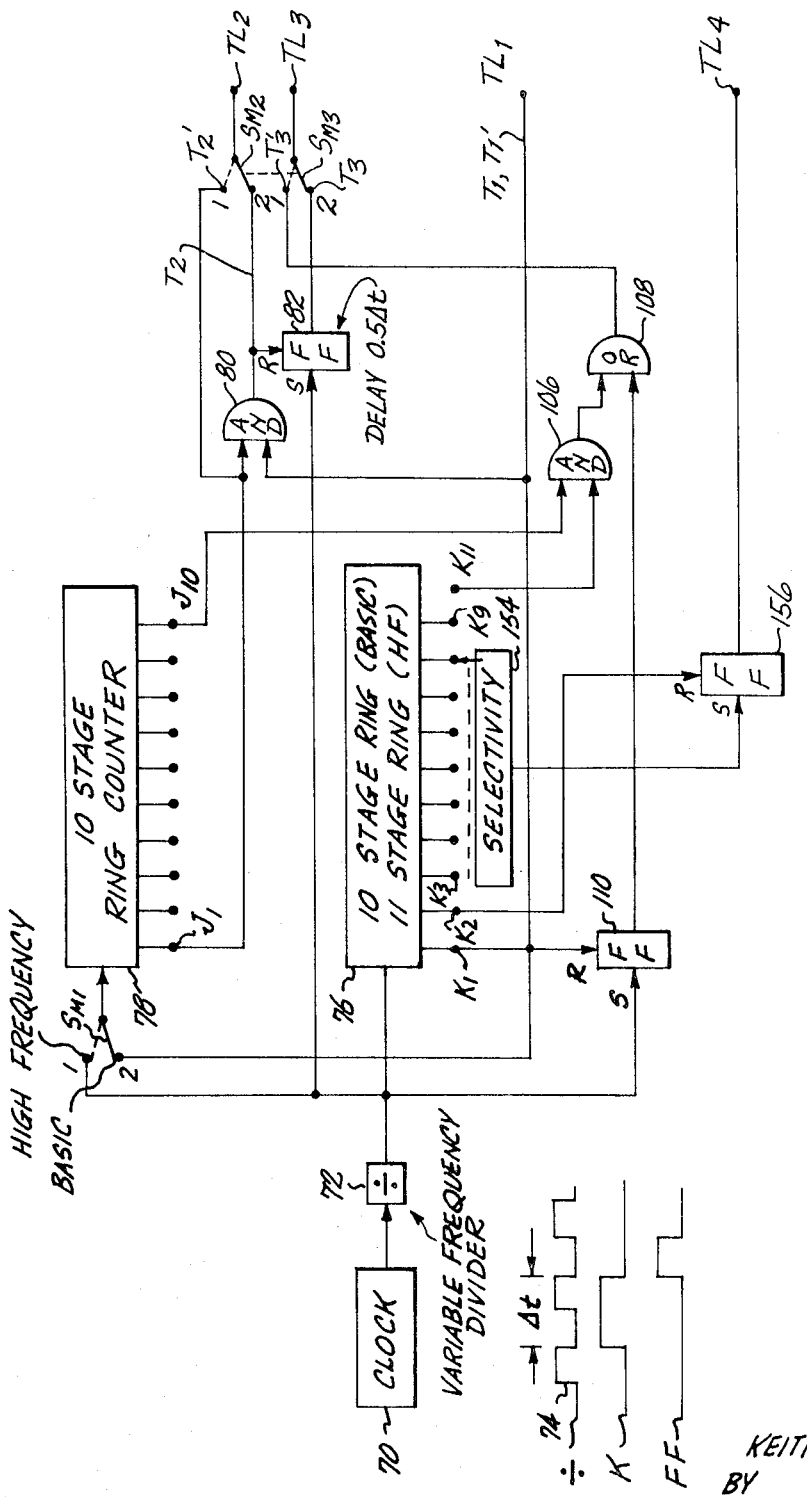
FIG. 2 is a block diagram of the basic timing circuitry for the analyzer illustrated in FIG. 1.
Figure 3:
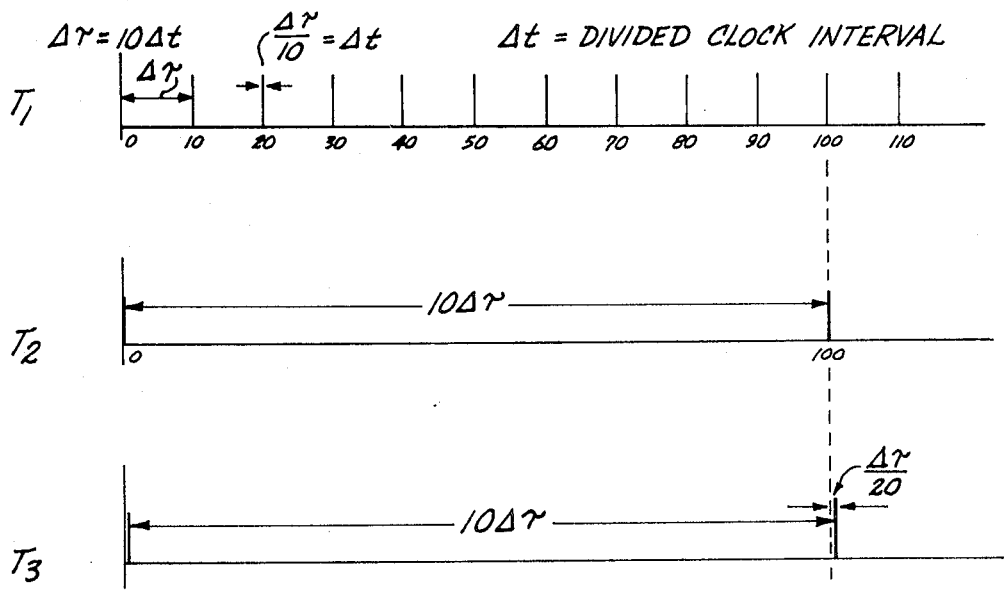
FIGS. 3 and 4 are timing diagrams for basic and high-frequency modes of operation of the analyzer as a correlator.

Hereafter the discussion proceeds on the assumption that P=10 and Q=3. FIG. 2 shows the basic timing control circuit for operation of the instrument in its several modes. A 10 megacycle clock circuit 70 applies a suitable square wave pulse train to a variable frequency divider 72. The pulse train 74 thus provided is applied to a master control ring counter 76 which has a capability of being switched between 10- ten- and 11-stage operation for basic and high frequency correlator modes, respectively. In the basic correlator mode, mode switches $S_{M1}$, $S_{M2}$ and $S_{M3}$ are in position 2. A timing waveform having a frequency of one-tenth of the basic pulse train 74 is generated at the first terminal $K_1$ of ring counter 76 and is applied through mode switch $S_{M1}$ to a second 10-stage ring counter 78. This waveform ($T_1$), provided at terminal $TL_1$ and shown in FIG. 3, is used for control of sampling of $f_1(t)$. In the basic correlator mode the pulse interval $\Delta\tau$ is equal to $10\Delta t$, where $\Delta t$ is the divided clock interval, i.e., the period of waveform 74 (FIG. 2).

The waveform at $T_1$ is also applied to one terminal of an optional AND-circuit 80, to the other terminal of which is applied the waveform appearing at the first output terminal $J_1$ of ring counter 78. This AND circuit is preferably included in order to obtain a sharp, precisely timed pulse for every tenth $T_1$ pulse. The pulse train ($T_2$) thus created having an interval $10\Delta\tau$ (see FIG. 3) as provided at terminal $TL_2$ through switch $S_{M2}$ is used for controlling sampling of quantized signal $f_2(t)$ by flip-flop 40 (FIG. 1).

A third timing waveform is provided at terminal $TL_3$. Flip-flop 82 has as its set input the divided clock pulse train 74 and as its reset input the output of AND-circuit 80 (waveform $T_2$). Thus flip-flop 82 is set at all times except when a reset pulse is provided every $10\Delta\tau$ by the waveform $T_2$. It provides an output pulse when reset, so that the waveform created is delayed by $0.5\Delta t$ with respect to the $T_2$ waveform, as shown in FIG. 3. It should be noted that each timing waveform pulse in the basic correlator mode has a width equal to $\Delta\tau/10$, and $T_3$ pulses follow $T_2$ pulses by $\Delta\tau/20$ or $0.5\Delta t$.

Therefore, in the basic correlation mode, analog sample and hold circuits 14 and 16 (FIG. 1) are operated under control of waveform $T_1$ to sample the inverted and uninverted form of analog input signal $f_1(t)$ at intervals $\Delta\tau$. Flip-flop 40 is operated under control of waveform $T_2$ to sample quantized input signal $f_2(t)$ at intervals $10\Delta\tau$, and each such sample is shifted into and through the distribution shift register 46 under control of delayed waveform $T_3$ of the same frequency.

Hence multiplier $M_1$, for example, receives a new sample of $f_2(t)$ each $10\Delta\tau$, and multiplies that signal value by the next succeeding 10 samples of $f_1(t)$ provided at terminals 20 and 22. The same $f_2(t)$ sample is then shifted to stage 2 of the distribution shift register and is multiplied by the next succeeding samples of $f_1(t)$, while a new sample shifted into stage 1 of the shift register is multiplied by the same succeeding 10 samples of $f_1(t)$, and so forth. Each sample of $f_2(t)$ stored in the stages of register 46 is multiplied in the respective multipliers responsive thereto, by the identical 10 $f_1(t)$ samples successively derived in the analog channel.

During each interval $10\Delta\tau$, 10 products are obtained by each multiplier, each corresponding to a different time delay (multiple of $\Delta\tau$). These are multiplexed to the separate averaging circuits under control of waveform $T_1$, so that each averager receives a product signal at each interval $10\Delta\tau$. Thus $10\Delta\tau$ is the product interval per correlation coefficient output.

Table II shows the resulting delay sequences for the first three multiplication channels. Each row opposite the designation $M_1$, $M_2$, and $M_3$ indicates the delays in units of $\Delta\tau$, while immediately below the delay indication is a designation of the time when the samples of $f_1(t)$ and $f_2(t)$ respectively, were taken, also in units of $\Delta\tau$ on either side of time zero. The minus signs (−) indicate samples taken before the time selected as zero for reference purposes. Thus it is seen that in any interval $10\Delta\tau$ (time zero through time nine) 30 product signals are obtained, corresponding to 30 different corresponding time delays.

Figure 5:
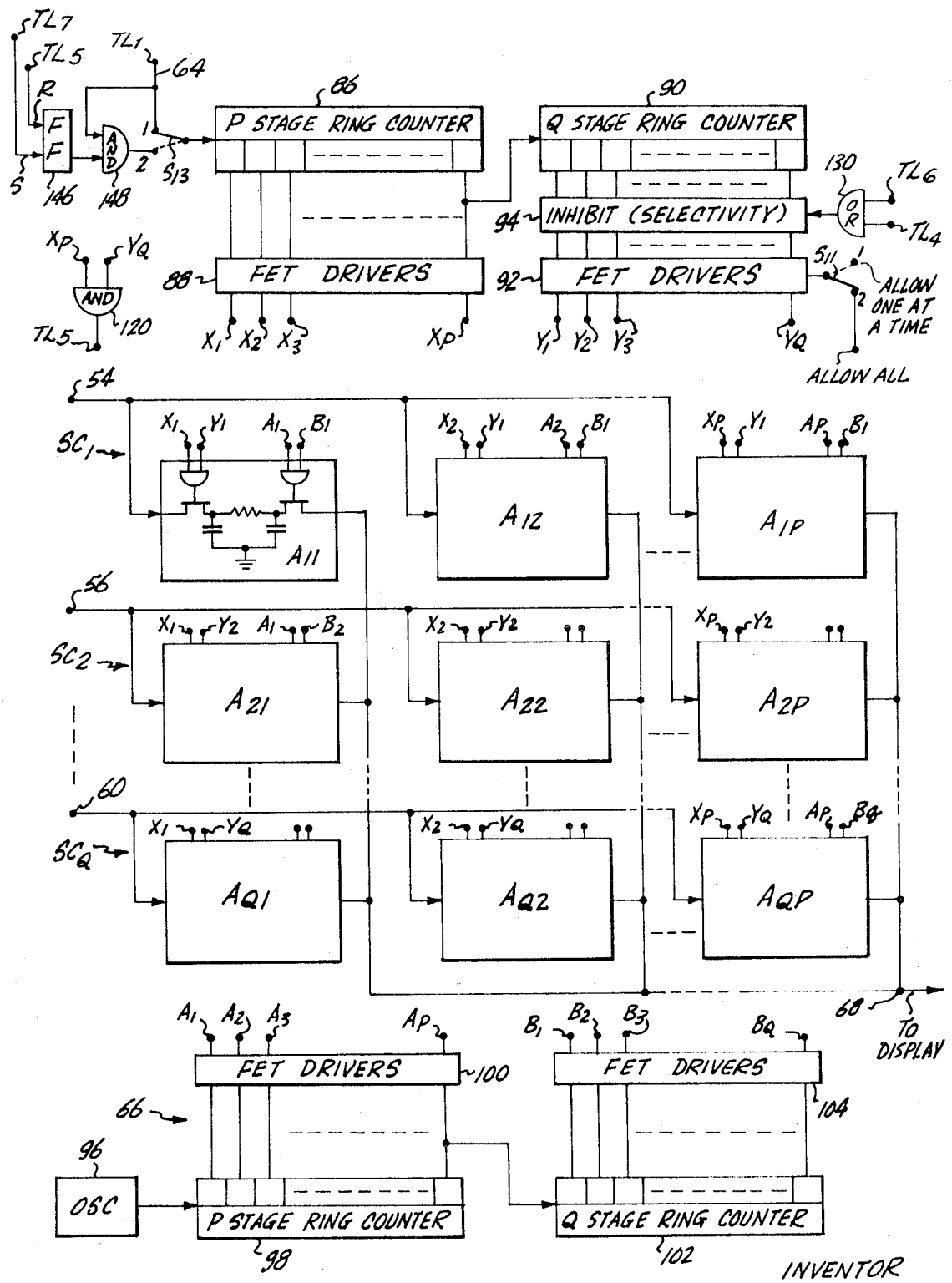
FIG. 5 is a block diagram of the scanning averager according to the invention and timing circuitry therefor.

Specific circuitry for controlling the multiplexing of the product signals to corresponding averaging circuits in the scanning averager 62 is illustrated in FIG. 5. The basic divided clock waveform $T_1$ at terminal 64 is applied to a P-stage ring counter 86 through switch $S_{13}$ in position 1. The X outputs of ring counter 86 are applied through field-effect transistor (FET) drivers 88 to the X control terminals of the averagers. In the matrix shown all of the $X_1$ terminals in the first column of averagers $A_{11}$, $A_{21}$...$A_{Q1}$, are energized simultaneously, then the $X_2$ terminals, etc.

The last output of ring counter 86 steps a Q-stage ring counter 90 whose Y outputs control the Y terminals of the averaging circuits through FET drivers 92 and inhibit circuitry 94 discussed hereinafter. In the correlation mode A switch $S_{11}$ (in position 2) applies to a terminal common to all of the FET drivers 92 a signal which causes all of the Y terminals to be energized simultaneously in the absence of the inhibit override control 94. Hence for correlation the separate sets of averagers respectively coupled to the multiplier terminals 54, 56,...60 are operated in parallel, stepped simultaneously by the X outputs of the P-stage ring counter.

As indicated previously the readout scanner 66 is operated independently of the input scanners in the scanning averager. An oscillator 96 steps a P-stage ring counter 98 to successively energize output terminals $A_1$, $A_2$...$A_P$ through FET drivers 100, and the last stage thereof steps a Q-stage ring counter 102 to energize output terminals $B_1$, $B_2$...$B_Q$ through FET drivers 104, the latter being stepped one step for each cycle of P-stage ring counter 98 to read all of the averaging circuits in the matrix sequentially. Thus, the separate averaged signal values are applied in succession to display terminal 68.

When the instrument is operated as a correlator in the high frequency mode, switches $S_{M1}$, $S_{M2}$ and $S_{M3}$ are placed in position 1, and ring counter 76 is switched to its high frequency (11 stage) mode whereby the last stage thereof is utilized. The circuitry shown in FIG. 2 then provides the timing waveforms $T_1'$, $T_2'$ and $T_3'$ shown in FIG. 4. The divided clock waveform is applied as before to the input of ring counter 76, and also to the 10-stage ring counter 78. Since counter 76 has one more stage than counter 78, iteration occurs so that the two counters are in phase only once in every 10 cycles of counter 76.

Figure 4:
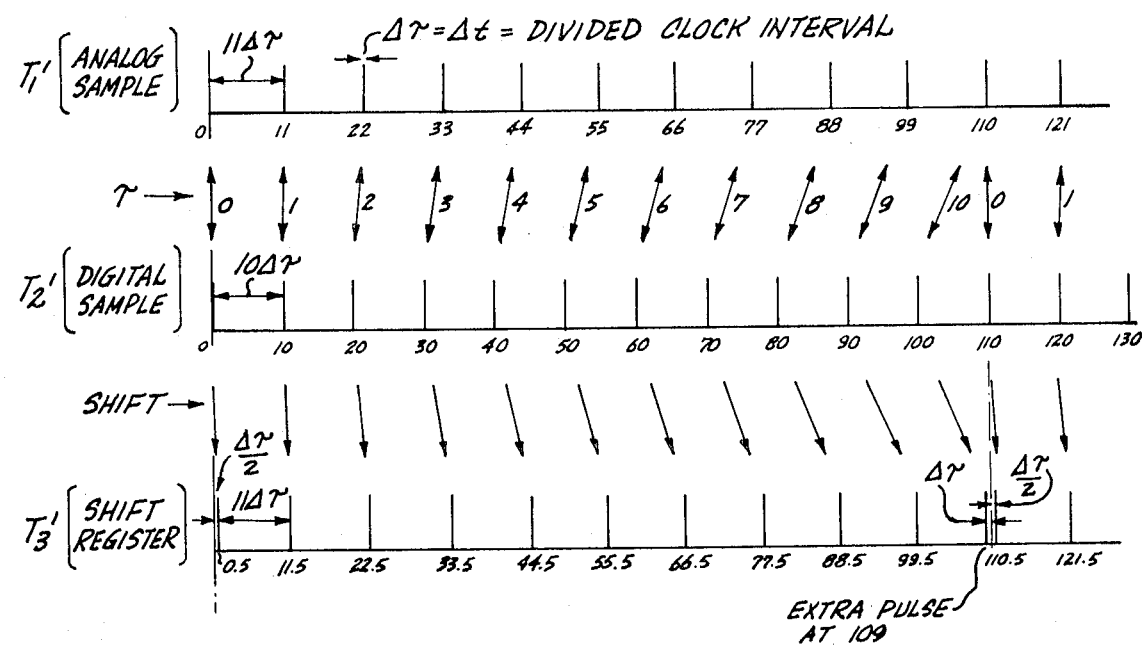

The first terminal $K_1$ of the 11-stage ring counter 76 again provides the basic control waveform $T_1'$, emitting a pulse on every eleventh cycle of the divided clock waveform. In FIG. 4 the pulses are numbered corresponding to the cycles of the divided clock waveform starting from any given time zero. The second control Waveform $T_2'$, which controls flip-flop 40, is obtained from the first output terminal $J_1$ of 10-stage ring counter 78. The pulses of this waveform are separated by 10 basic time units $\Delta t$. Thus $11T_2'$ pulses occur for each 10 $T_1'$ pulses and coincidence occurs every 110 cycles of the divided clock waveform.

It would appear at this point that one sample will be lost and not multiplied in view of the iteration. However, this is not the case, since a special timing control is provided to effect an extra shift in the distribution shift register 46 for each 10 cycles of ring counter 76 and thereby achieve a multiplication of all samples obtained, while obtaining the same array of Q-delay times.

To provide the extra shift pulse an AND-circuit 106 is coupled to the last outputs $K_{11}$ and $J_{10}$ of ring counters 76 and 78, respectively, to provide a coincidence pulse which occurs just prior to each 110th cycle of the divided clock waveform, just when the two counters are about to cycle once in phase. The coincidence pulse is supplied at terminal $TL_3$ through circuit 108 and switch $S_{M3}$ at time 109. Except for the extra pulse the $T_3'$ waveform is identical to the $T_1'$ waveform but delayed therefrom by $0.5\Delta t$ because of the interposed flip-flop 110.

Comparing waveforms $T_2'$ and $T_3'$ in FIG. 4 it is seen that flip-flop 40 samples $f_2(t)$ once each 10th time unit, and each sample is shifted into the shift register 46 by $T_3''$ pulses which occur after a delay which increases by one time unit per sample, until the digital sample taken at time 90 is shifted into the register at time 99.5. As the digital samples taken at times 0, 10, 20 etc., are shifted into the register they are multiplied by analog samples taken at times 0, 11, 22, etc. The first set of arrows in FIG. 4 indicate the pairing of digital and analog samples, while the second set of arrows indicate the shift of digital samples. The digital sample taken at time 90 and shifted into the first stage of the register at time 99.5 is multiplied in multiplier $M_1$ by the analog sample taken at time 99 ($\tau=9\Delta\tau$).

If the extra pulse were not provided, the digital sample taken by the flip-flop 40 at time 110 would cause the loss of the sample taken at time 100 before it could be shifted to the shift register, which shift would normally not occur until time 100.5. The statistical sampling of the signal $f_2(t)$ and the correlation measurement would be thereby distorted.

The extra pulse thus shifts the digital sample taken at time 100 into the first stage of the shift register at time 109. This sample is immediately shifted again at time 110.5 when the digital sample taken at time 110 is shifted into the first stage of the register. Therefore, the digital sample taken at time 100 is not multiplied in multiplier $M_1$, but only in multipliers $M_2$, $M_3$, etc., and this is true of each 11th or (P+1)th digital sample. Each such sample is shifted through the first stage of the distribution register between the time the scanner makes contact with two adjacent averaging circuits.

The time delay sequences thus established for the high frequency mode can be verified by reference to table III wherein the delays $\tau$ are given in units of $\Delta\tau$ in rows opposite the multiplier designations $M_1$, $M_2$ and $M_3$. Immediately below the delays the timing of analog and digital samples are given, just as in table II for the basic correlation mode. Note that no digital sample taken at time 100 appears in the $M_1$ row.

It will be observed that the product interval for each correlation coefficient output in the high frequency mode is $110\Delta\tau$, since in one scan of the input scanners $SC_1$, $SC_2$... each averager receives one of the 10 products obtained during that scan, and the products are separated by intervals $11\Delta\tau$, that is $(P+1)\Delta\tau$. See FIG. 4. In contrast, the per output channel product interval in the basic mode is $10\Delta\tau$, products being obtained every interval $\Delta\tau$. See FIG. 3. However, the delay increment is smaller. For the higher frequency mode $\Delta\tau=\Delta t$ (the clock interval), whereas for the basic mode $\Delta\tau=10\Delta t$. Thus higher resolution (better definition) is obtained in the high frequency mode by smaller separations of the correlation coefficient, though at a slight sacrifice in statistical accuracy because of the lower product rate per coefficient.

However, it has not been possible heretofore to obtain $\Delta\tau$ as small as in the high frequency mode of this instrument. When possible, the basic correlator mode should be used if a particular required delay increment can be obtained thereby, in preference to using the high frequency mode, since the basic mode provides better statistical accuracy. However, when the required sampling or delay interval $\Delta\tau$ is too small for the basic mode, then the high frequency mode will give good statistical accuracy. As indicated previously, the reduction in statistical accuracy is negligible, since products obtained at a higher rate would not provide statistically independent data.

Amplitude Probability Distribution

When the random signal analyzer according to the invention is operated to compute the APD of a signal, much of the same circuitry heretofore described with reference to the correlation mode of operation is utilized. The signal whose APD is to be random is applied as signal $f_2(t)$ to terminal $b$. Switch $S_1$ may be in either position, since ganged switches $S_2$ to $S_5$ are in position 1. The signal is applied through line 12 to first and second digital comparators 24 and 26 whose outputs are connected to exclusive OR-circuit 28. However, digital comparator 26 and exclusive OR-circuit 28 are not utilized in this mode (just as in the correlator mode), since switch $S_6$ is in position 2. Switch $S_{12}$ is in position 1 for this mode, so that the circuitry leading thereto is utilized, as will be described hereinafter.

The digital comparator 24 compares the input signal with a ramp signal generated by a suitable digital ramp generator 112 and supplied to the comparator through switch $S_3$ in position 2 and $S_{10}$ in position 1. Thus at any instant the digital comparator provides a quantized output representing the probability of the input signal being greater or less than the ramp function provided generator 112. The quantized output 34 is supplied through switch $S_7$ in position 1 to variable bias delay circuit 38 and flip-flop 40. However, to assure that this circuitry is not utilized in the APD measurement flip-flop 40 is held in its reset position by an auxiliary reset terminal 114 connected to ground through switch $S_5$ in position 1, thus providing only zeros to the shift register input 44 and hence to OR-circuits 52.

The quantized output of comparator 24 is applied through switch $S_6$ in position 2 and switch $S_4$ in position 1 to line 116 and OR-circuits 52, and hence to multipliers $M_1, M_2...M_Q$.

In the analog input channel switch $S_2$ in position 1 connects the sample and hold circuits to a reference voltage $V_R$ so that positive and negative reference levels are applied to the multiplier circuits through lines 20 and 22. All of the multipliers receive the same quantized probability signal through common input 116 to OR-circuits 52, and this signal appears as $\pm V_R$ at each of the multiplier outputs 54, 56, 58...60.

However, the probability signal is applied to the averagers in the scanning averager 62 only one at a time (not in parallel as in the correlation mode), by virtue of an altered form of operation thereof. Referring to FIG. 5, switch $S_{11}$ coupled to FET drivers 92 is in position 1 for the APD mode, so that the Y-output terminals of Q-stage ring counter 90 are energized one at a time as they are stepped by energization of the last output $X_P$ of the P-stage ring counter 86. Hence the averaging circuits $A_{11}, A_{12}...A_{1P}$ in the first set are connected sequentially to multiplier $M_1$, then the second set of averagers $A_{21}, A_{22}...A_{2P}$ are connected to multiplier $M_2$, and so on until the final set of averaging circuits $A_{Q1}, A_{Q2}...A_{QP}$ are connected sequentially to multiplier $M_Q$.

Both the ramp function provided by generator 112 (FIG. 1) and the scanner are controlled by the same timing waveform $T_1$ so that they are recycled together. The stairstep-type ramp function steps to a new value for each step of the scanning averager 62. It is recycled by pulses at input terminal 119 thereof, derived through an AND-circuit 120 (FIG. 5) by coincidence of counter outputs $X_P$ and $Y_Q$, which occurs at the end of each complete cycle of Q-stage ring counter 90.

The probability signals resulting from comparison of the input signal discrete values of the ramp function are thus multiplexed to the appropriate averagers, each of which provides a signal average representative of the probability of the input signal being greater or less than the particular value of the ramp function to which is corresponds. The outputs of the averaging circuits collectively represent the amplitude probability distribution for the input signal, which is displayed in real time by independent operation of the readout scanner 66 and suitable display means coupled to output terminal 68.

The ramp function is typically chosen to rise from a negative value to a positive value, with the lowest (starting) value being chosen so that the probability of the input signal being less than the ramp function at its lowest values is small. In order to enhance the APD output representation, special enhancement logic is provided including a binary counter circuit 120 (FIG. 1) stepped by the signal provided at terminal $T_5$ (FIG. 5). Counter 120 preferably comprises a three-bit binary counter having three parallel outputs to a NAND-circuit 122. The NAND circuit is chosen in order to provide a weighing function having a ratio of 7 to 8. That is, it provides an output for seven out of every eight cycles of the scanning averager. Special inhibit circuit 124 coupled to the output of NAND-circuit 122 inhibits the input gates to the averaging circuits for seven-eighths of the time, except when digital comparator 24 produces a one indicating that the input signal is greater than the ramp function.

The modulated inhibit signal from comparator 24 and inhibit circuit 124 is applied at terminal $TL_6$ through switch $S_{12}$ in position 1 to one input of an OR-circuit 130 (FIG. 5), which controls the inhibit circuits 94 interposed between the Q-stage ring counter 90 and its FET drivers 92. With an inhibit instruction from NAND-circuit 122 neither a positive nor negative reference signal value $V_R$ is applied to the averager. The enhancement logic thus imposes a seven-eighths weighing function on all zeros supplied by digital comparator 24, without affecting the application of ones of the averaging circuits. This introduces some nonlinearity into the APD function (and to the APDD function described hereinafter as well). However the nonlinearity is acceptable in view of the enhanced APD measurement for low ramp function values.

Amplitude Probability Density Distribution

The APDD mode of operation is very similar to that for APD, and all switch positions are the same except switch $S_6$, which for APDD is in position 1. The ramp function output of generator 112 supplied through switch $S_3$ is added in ADD-circuit 132 to a small voltage increment $\Delta V_1$ supplied by a suitable DC voltage source 134, and the sum is applied to digital comparator 26.

While digital comparator 24 compares the input signal $f_2(t)$ directly with the ramp function, digital comparator 26 compares it with the ramp function plus $\Delta V_1$. Comparator 24 measures the probability of the input signal being greater than the ramp function, while digital comparator 26 measures the probability of the input signal being less than the ramp function plus $\Delta V_1$. Comparator 24 applies to exclusive OR-circuit 28 a zero if $f_2(t)$ is greater than the ramp voltage at a given instant and a one if it is less than the ramp voltage. Comparator 26 applies to exclusive OR-circuit 28 a zero if $f_2(t)$ is greater than the ramp voltage plus $\Delta V_1$, and a one if it is less than that sum. Exclusive OR-circuit 28 applies a zero to switch $S_6$ if both its inputs are zero or if both are one, thus providing a zero when the input signal is either smaller than the ramp voltage or greater than the ramp voltage plus $\Delta V_1$. A one is supplied to switch $S_6$ only in the even that the input voltage at a given instant is greater than the ramp voltage and less than the ramp voltage plus $\Delta V_1$ and hence is within $\Delta V_1$ of the ramp voltage. (The condition of $f_2(t)$ being less than the ramp voltage but greater than the ramp voltage plus $\Delta V_1$ never occurs).

Since the ramp function provided be generator 112 is synchronized with the scanning averager 62, which scans all of the averagers in sequence corresponding to the advance of the ramp function through its sequence of values, each averaging circuit computes the probability of the input signal being within $\Delta V_1$ of the ramp voltage value to which it corresponds. The averaging circuits collectively provide in real time the APDD function accordingly. This function is modified, however, by the enhancement logic described heretofore in connection with the APD mode of operation.

Signal Averaging

When the instrument is operated in the signal-averaging mode, sometimes referred to as computation of average transients, the purpose is to measure the average response of a system to a repeated stimulus. For example, an electronic system whose response to a given unit voltage input is to be measured, is subjected to a repeating stimulus and its output signal is applied as the input to the present instrument. In addition, the stimulus, or a suitable trigger voltage synchronized with it, is applied to input $c$, which is one input to a digital comparator 136 serving as a level detector. The other input to comparator 136 is a reference $V_D$ derived from a suitable DC source 138. Comparator 136 thus supplies an input to flip-flop 140 when the stimulus voltage applied at terminal $c$ exceeds the reference voltage $V_D$.

Timing waveform $T_1$ is applied to the reset terminal of flip-flop 140, so that immediately following reception of the stimulus voltage flip-flop 140 applies an input to one terminal of an AND-circuit 142 and to the reset terminal of flip-flop 144. However, flip-flop 144 will not provide an output to the other terminal of AND-circuit 142 unless it has been set by a signal at terminal $TL_5$ which referring to FIG. 5, occurs at the end of each cycle of the scanning averager with coincidence of signals at terminals $X_P$ and $Y_Q$. Flip-flops 140 and 144 and AND-circuit 142 thus comprise lockout logic causing the instrument to ignore any stimulus signal arriving at terminal $c$ following a given stimulus by less than the time required for the scanning averager to complete one scan.

With switches $S_7$ to $S_9$ in position 2, the output of AND-circuit 142 is applied to variable bias delay circuit 38. This circuit provides the capability of interposing a delay between arrival of the stimulus trigger at input $c$ and the beginning of the scan of scanning averager 62. Following the delay thus selected, if any, the start signal is supplied to the set terminal of flip-flop 40 whose output signal is supplied through switch $S_9$ to terminal $TL_7$. Terminal $TL_7$ is the set terminal of a flip-flop 146 (FIG. 5), the reset terminal of which is connected to terminal $TL_5$ which supplies the indication that the scanning averager has completed its scan. The output of flip-flop 146 is thus applied to an AND-circuit 148 only in the event that the scanning averager has completed its scan and after the interposed period of bias delay has elapsed. AND-circuit 148 permits waveform $T_1$ to step ring counter 86, through switch $S_{13}$ in position 2. Since switch $S_{11}$ is in position 1 the scanning averager scans all of the averaging circuits sequentially before returning to its start position. Following a complete scan of the scanning averager flip-flop 144 (FIG. 1) conditions the instrument to accept the next stimulus trigger voltage at terminal $c$, as previously described.

The signal representing the output of the system whose response is being measured is preferably applied at terminal $a$ as signal $f_1(t)$, with switch $S_1$ in position 1. With switch $S_2$ in position 2, sample and hold circuits 14 and 16 provide positive and negative representations of the response signal on lines 20 and 22 to each of the multiplier circuits $M_1$, $M_2$, $M_3$...$M_Q$. Since switch $S_4$ is in position 2 the OR-circuits 52 provide zeros to the multipliers and shift register 46 is out of action with switches $S_7$ to $S_9$ in position 2. Thus only one side of each multiplier is used, thereby transmitting the analog samples of the input signal to the averaging circuits under control of timing waveform $T_1$ applied to the sample and hold circuitry. Since the stepping of the scanning averager is coordinated with the analog sampling of the input signal by waveform $T_1$, the analog samples of the response signal are successively applied to the averagers at times successively delayed from arrival of the stimulus voltage at terminal $c$. After successive applications of the stimulus over a period equal to the time constant of the scanning averager, each averaging circuit provides a signal representative of the average response of the measured system for the delay time to which each such averaging circuit corresponds.

The readout scanner 66 supplies at output terminal 68 a representation of the entire average response function of the system, displayed in real time so that the response of the measured system can be observed while that system is adjusted or the stimulus applied to it is altered.

Effective Time Constant Of The Scanning Averager

Figure 6:
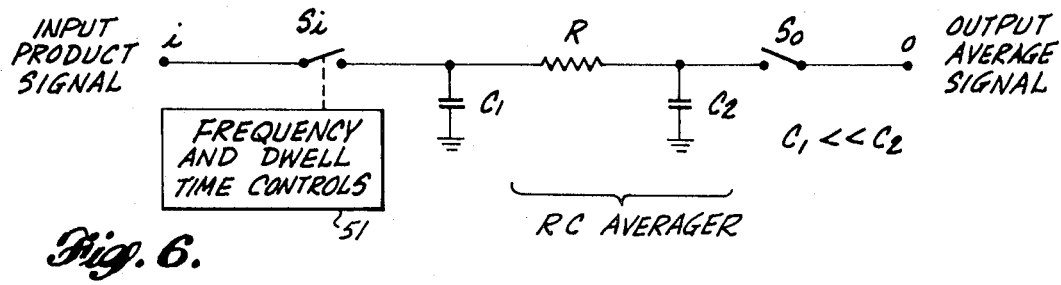
FIG. 6 is a circuit diagram of the preferred form of an individual averaging circuit in the scanning averager.

In accordance with the preferred form of the invention each of the averager circuits in the scanning averager has the basic structure shown in FIG. 6. Each includes input and output switches $S_i$ and $S_0$, which correspond to individual FET-gates controlled by AND-circuits to which X and Y or A and B inputs are applied as indicated in FIG. 5. Product signals from a multiplier are applied at input $i$, while output terminal $o$ corresponds to display output terminal 68. Resistance R and capacitor $c_2$ are the basic averaging circuit, while capacitor $C_1$ is a sample and hold capacitor of much smaller value than capacitor $C_2$, conferring upon the circuit unique operational features in combination with the timing control features of the instrument.

Each averaging circuit operates intermittently, of course, with operation of the input scanner. A product signal is available to a particular averaging circuit during only a portion of the instrument cycle. In the basic correlation mode this portion is equal to a fraction $t_n$ (FIG. 7) of the delay (sampling) increment of time $\Delta\tau$, while during the remainder of the cycle (greater than $(P-1)\Delta\tau$) product signals are being applied to other averaging circuits.

Figure 7:
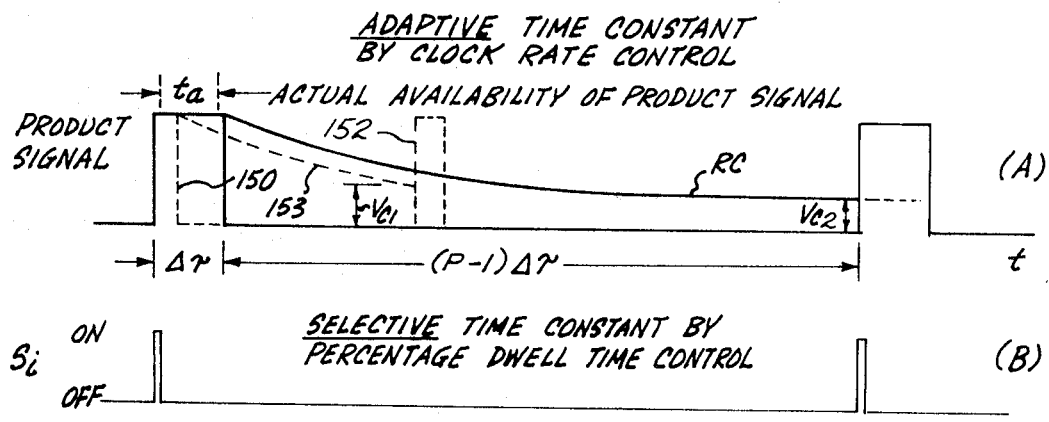
FIGS. 7 and 8 are diagrams utilized in describing the operation of the scanning averager.

During the intervening period between closures of switch $S_i$ the product signal last received and sampled by the sample and hold capacitor $C_1$ tends to decay toward the voltage $V_{C2}$ on capacitor $C_2$ as indicated in part (A) of FIG. 7. That is, the two capacitors tend to approach equilibrium between applications of a product signal, in accordance with a composite distribution (or series) time constant RC of the averaging circuit including capacitor $C_1$. Since $C_1$ is much smaller than $C_2$, this time constant is very nearly equal to $RC_1$.

With reference to part (A) of FIG. 7 it can be seen that the decay rate during this "off" period is always of the same form, being dependent only on capacitor and resistance values. If the clock rate is increased (smaller product interval), the approach toward equilibrium in the averaging circuit will progress to a lesser extent than for a lower clock rate (larger product interval). This is illustrated by the dotted pulse 150, indicating the lessened availability or dwell time, and dotted line pulse 152, indicating the smaller interval between dwell times. The dotted line decay function 153 shows that the voltage on capacitor $C_1$ will tend to approach a value $C_{C'}$ which is greater than $V_{C2}$, that is, less decay has taken place.

In the absence of capacitor $C_1$ the input voltage would immediately assume the voltage $V_{C2}$ when switch $S_i$ is opened. With capacitor $C_1$ in the circuit, product rates within a predetermined range determined by its value will result in a residue of charge or voltage remaining on capacitor $C_1$ when a new product signal is applied, because a fraction of the previous product signal is still held on the capacitor. The higher the product rate is, the larger this fraction will be, on the average.

This affects the averaging time constant of the circuit in such a way that for higher product rates (smaller product intervals) the effective time constant is less, and and for lower product rates it is greater. The advantages flowing from this automatic adjustment are very apparent, since a shorter averaging time constant is needed for higher product rates, and vice versa, but it would be quite impractical to change circuit components to make the adjustment.

Figure 8:
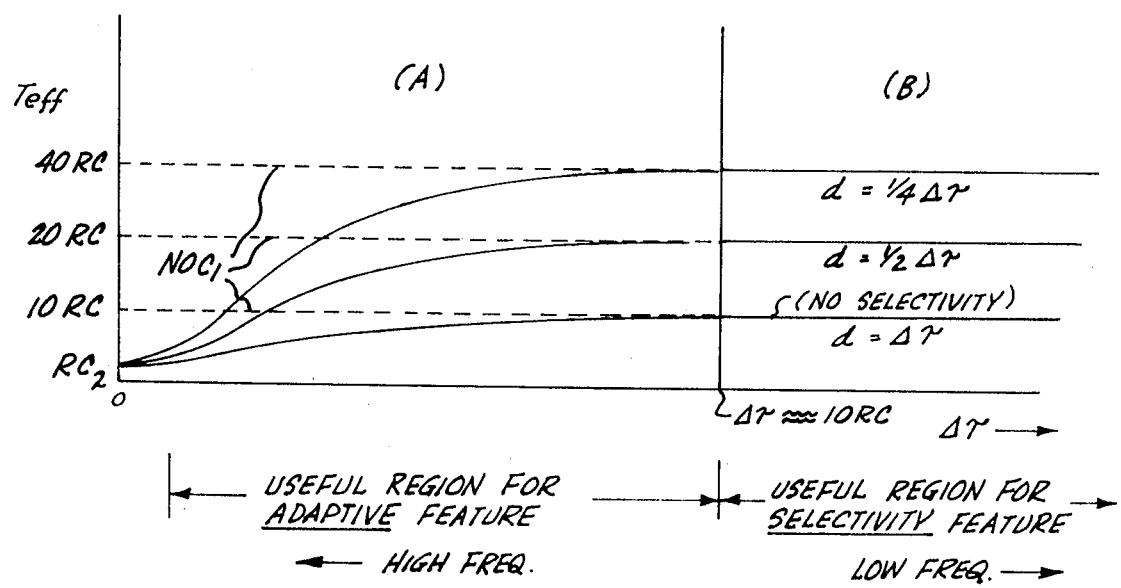

Another representation of the adaptivity feature is shown in part (A) of FIG. 8, which is a plot of the effective time constant $T_{eff}$ versus the delay increment of sampling interval $\Delta\tau$. Each curve represents the effective time constant $T_{eff}$ for sampling intervals $\Delta\tau$ up to a sampling interval which is large compared to the distribution time constant RC effective in the redistribution of charge when $S_i$ is open. With $\Delta\tau << RC$ the product samples are held on $C_1$ without significant decay between successive closures of switch $S_i$ and the effective averaging time constant $T_{eff}$ is then approximately equal to $RC_2$. For very high-product rates, therefore, $C_1$ has the effect of "hiding" the fact that $S_i$ is open for most of the instrument cycle.

When $\Delta\tau >> RC$ the product samples temporarily stored on $C_1$ decay completely to the voltage on $C_2$ during the initial time following the opening of switch $S_1$. The effective averaging time constant $T_{eff}$ then approximately equals $RC_2$ multiplied by a factor closely related to the duty factor of the switch $S_t$.

When $\Delta\tau$ is comparable with the distribution time constant $RC$, an intermediate value of effective averaging time constant is obtained according to the curves shown in FIG. 8, from which it is apparent that the effective time constant $T_{eff}$ automatically adjusts itself according to the value of $\Delta\tau$ selected, within a predetermined range of values of $\Delta\tau$.

The effective time constant of the scanning averager can also be altered, again without changing circuit components, by altering the percentage of dwell time of the scanner switches ($S_t$). Referring to FIG. 2, a manual dwell time selectivity switch 154 is included to permit selection of any of the intermediate output terminals $K_3$ to $K_9$ of the 10- or 11-stage ring counter 76. The output of the switch 154 is applied to the set terminal of a flip-flop 156, whose reset terminal is coupled to the second output terminal $K_2$ of counter 76. A selectivity control waveform is thereby provided at output terminal $TL_4$ of the flip-flop, and is applied to OR-circuit 130 (FIG. 5) whose output is applied to the inhibit circuitry 94 interposed between the outputs of Q-stage ring counter 90 and the FET drivers 92. The inhibit circuitry 94 responds to the $TL_4$ waveform by allowing any Y output only within the interval established by energization of output $K_2$ of counter 76 and energization of the next counter output, such as $K_9$, to which the selectivity switch 154 is connected. The Y output to the averager input switches thus determines the dwell time of the input switch whether switch $S_{11}$ is in the "allow all" or in the "allow one at a time" position.

Part (B) of FIG. 8 shows that if the dwell time $d$ were selected as equal to the interval $\Delta\tau$, then the effective time constant $T_{eff}$ would be equal to the time constant multiplied by P, where P is the number of averaging circuits with which each multiplier is shared. If 10 averaging circuits are included in each set (P=10), then the effective time constant $T_{eff}$ for $d=\Delta\tau$ is 10 RC. For $d=\Delta\tau/2$, $T_{eff}$=20 RC, and for $d=\Delta\tau/4$, $T_{eff}$=40 RC.

FIG. 8 also shows that the different selected dwell times result in different effective times constants with somewhat different adaptivity capabilities, as approximately defined by the curves shown.

Hence the combination of the special RC averaging circuit including sample and hold capacitor $C_1$, with the frequency and dwell time controls 51 (FIG. 6), provides a unique capability for extending the effective time constant of the averaging circuits without altering the values of the components therein and for automatic adaptation of the time components therein and for automatic adaptation of the time constant to different instrument operation rates. The scanning averager is therefore particularly suited to confer upon the random signal analyzer provided by this invention a flexibility not heretofore possible. Such flexibility is particularly important when the instrument is operated as a correlator suitable for both normal and high frequency modes of operation, and when it is operated as a signal averager (computer of averager transients) this flexibility permits wide selection of the response measurement period and sampling interval $\Delta\tau$.

Conclusion

The random signal analyzer disclosed herein is particularly suited for low-cost random signal analysis on an online, real time basis, enabling measurements of correlation, APD, APDD, and signal averaging in a single compact instrument. In addition, a unique scanning averager adapted for use in such measurements (and others) is provided. Modifications and adaptations of the disclosed system or any of its subsystems within the scope of the basic principles involved as defined in the appended claims will be recognized by those skilled in the art.

APPENDIX
TABLE I.—SWITCH POSITIONS [1]

| Mode | Correlation | | | | APD | APDD | Average |
|---|---|---|---|---|---|---|---|
| | Auto | Cross | Relay | Linear | | | |
| Switch: | | | | | | | |
| $S_1$ | 2 | 1 | | | | | |
| $S_7-S_8$ | 2 | 2 | 2 | 2 | 1 | 1 | 2 |
| $S_6$ | | | | | 2 | 1 | |
| $S_7-S_9$ | 1 | 1 | 1 | 1 | 1 | 1 | 2 |
| $S_{10}$ | | | | 2 | 1 | 1 | |
| $S_{11}$ | 2 | 2 | 2 | 2 | 1 | 1 | 1 |
| $S_{12}$ | 2 | 2 | 2 | 2 | 1 | 1 | 2 |
| $S_{13}$ | 1 | 1 | 1 | 1 | 1 | 1 | 2 |

[1] Absence of number means either position is permitted.

TABLE II.—DELAY SEQUENCES IN BASIC CORRELATOR MODE
[P=10  Q=3]

| Time interval (units of $\Delta\tau$) | 0 | 1 | 2 | 3 | 4 | 5 | 6 | 7 | 8 | 9 | 10 | 11 |
|---|---|---|---|---|---|---|---|---|---|---|---|---|
| | | | | | Sample delays (units of $\Delta\tau$) | | | | | | | |
| Multipliers: | | | | | | | | | | | | |
| $M_1\tau\rightarrow$ | 0 | 1 | 2 | 3 | 4 | 5 | 6 | 7 | 8 | 9 | 0 | 1 |
| $f_2(t)\ f_1(t)$ | 0 0 | 0 1 | 0 2 | 0 3 | 0 4 | 0 5 | 0 6 | 0 7 | 0 8 | 0 9 | 10 10 | 10 11 |
| $M_2\tau\rightarrow$ | 10 | 11 | 12 | 13 | 14 | 15 | 16 | 17 | 18 | 19 | 10 | 11 |
| $f_2(t)\ f_1(t)\rightarrow$ | −10 0 | −10 1 | −10 2 | −10 3 | −10 4 | −10 5 | −10 6 | −10 7 | −10 8 | −10 9 | −0 10 | 0 11 |
| $M_3\tau\rightarrow$ | 20 | 21 | 22 | 23 | 24 | 25 | 26 | 27 | 28 | 29 | 20 | 21 |
| $f_3(t)\ f_1(t)\rightarrow$ | −20 0 | −20 1 | −20 2 | −20 3 | −20 4 | −20 5 | −20 6 | −20 7 | −20 8 | −20 9 | −10 10 | −10 11 |

TABLE III.—DELAY SEQUENCES IN HIGH FREQUENCY MODE
[P=10  Q=3]

| Time interval (units of $\Delta\tau$) | 0 | 11 | 22 | 33 | 44 | 55 | 66 | 77 | 88 | 99 | 110 | 121 | 132 |
|---|---|---|---|---|---|---|---|---|---|---|---|---|---|
| | | | | | | Sample delays (units of $\Delta\tau$) | | | | | | | |
| Multiplier: | | | | | | | | | | | | | |
| $M_1\tau\rightarrow$ | 0 | 1 | 2 | 3 | 4 | 5 | 6 | 7 | 8 | 9 | 0 | 1 | 2 |
| $f_2(t)\ f_1(t)\rightarrow$ | 0 0 | 10 11 | 20 22 | 30 33 | 40 44 | 50 55 | 60 66 | 70 77 | 80 88 | 90 99 | 110 110 | 120 121 | 130 132 |
| $M_2$ | 10 | 11 | 12 | 13 | 14 | 15 | 16 | 17 | 18 | 19 | 10 | 11 | 12 |
| | −10 0 | 0 11 | 10 22 | 20 33 | 30 44 | 40 55 | 50 66 | 60 77 | 70 88 | 80 99 | 100 110 | 110 121 | 120 132 |
| $M_3$ | 20 | 21 | 22 | 23 | 24 | 25 | 26 | 27 | 28 | 29 | 20 | 21 | 22 |
| | −20 0 | −10 11 | 0 22 | 10 33 | 20 44 | 30 55 | 40 66 | 50 77 | 60 88 | 70 99 | 90 110 | 100 121 | 110 132 |

What is claimed is:

1. A system for analysis of first and second electrical signals, comprising:
   a. first sampling means for providing samples of the first signal;
   b. second sampling means for providing quantized digital samples of the second signal;
   c. a shift register coupled to the second sampling means for receiving and storing successively derived values of said quantized digital samples, said register having Q-stages into which said samples are shifted sequentially, where Q is an integer;

d. multiplying means having Q multiplication channels, each channel being coupled to the first sampling means and to one of the shift register stages for multiplying said quantized digital samples stored therein by samples from said first sampling means;

e. averaging means including Q sets of separate signal averagers, each set being response to one of said multiplication channels, respectively, and each consisting of a plurality P of said averagers, where the product P(Q) equals the number of desired output values;

f. scanning means for intermittently connecting each of said Q multiplication channels successively to each of the P averagers in the set of averagers responsive thereto; and g. timing control apparatus including:
1. first control means coupled to the first sampling means to effect sampling of the first signal at intervals $N\Delta\tau$, where N is an integer equal to unity, P+1 or P−1;
2. second control means coupled to second sampling means to effect sampling of the second signal at intervals $M\Delta\tau$, where M is an integer equal to P;
3. third control means coupled to the shift register to effect shifting of second signal samples at intervals $R\Delta\tau$, where R is an integer equal to one of the integers N and M, and
4. fourth control means coupled to the scanning means for effecting connections of each multiplication channel to the separate averagers in the set responsive thereto, sequentially at intervals $N\Delta\tau$.

2. The system defined in claim 1 wherein:
a. said timing control apparatus includes mode selection means establishing a first mode of operation, including:
1. first means altering said first control means to effect sampling of the first signal at intervals $\Delta\tau(N=1)$; and
2. second means altering said third control means to effect shifting of said shift register at intervals $M\Delta\tau(R=M)$; and
b. each of said Q sets of averagers includes plurality M of said averagers (P=M).

3. The system defined in claim 2 wherein:
a. said mode selection means establishes a second mode of operation in said system:
1. wherein said first means alters said first control means to effect sampling of the first signal at intervals $N\Delta\tau$, where N>1;
2. further comprising third means altering said second control means to effect sampling of the second signal at intervals $(N-1)\Delta\tau$ or $(N+1)\Delta\tau$, whereby M=N−1 or N+1;
3. said second means alters said third control means to effect shifting of said shift register at intervals $N\Delta\tau$, whereby R=N; and
b. said third control means further includes an auxiliary control for shifting said register one extra shift for each Nth shift thereof.

4. The system defined in claim 3 wherein said timing control apparatus includes:
a. variable frequency clock means for providing a basic timing waveform;
b. said first control means and said fourth control means include a ring counter having M+1 output stages successively energized in response to said basic timing waveform;
c. said first altering means of said mode selection means utilizes said M output stages thereof for said first mode of operation and utilizing said M+1 output stages for said second mode of operation;
d. said first control means and said fourth control means each including means coupled to the first output stage of said ring counter.

5. The system defined in claim 4 wherein said timing control apparatus further includes:

a. a second ring counter within said second and third control means having M output stages successively energized in response to an applied timing waveform;
b. said third altering means of said mode selection means further including a switch coupled to the first output stage of the first mentioned ring counter and to said clock means for selectively applying to the input of said second counter the waveform provided at the first output stage of said first mentioned ring counter for first mode of operation and applying said basic timing waveform thereto for said second mode of operation; and
c. said second and third control means include means coupled to the waveform provided at the first output stage of said second ring counter.

6. The system defined in claim 1 wherein said timing control apparatus includes:
a. first means altering said second control means to effect sampling of the second signal at intervals $(N-1)\Delta\tau$ or $(N+1)\Delta\Phi\tau$, whereby M=N−1 or N+1 and N>1;
b. second means altering said third control means to effect shifting of said shift register at intervals $N\Delta\tau$, whereby R+N;
c. said third control means further includes an auxiliary control for shifting said register one extra shift for each Nth shift thereof; and,
d. each of said Q sets of averagers includes a plurality N−1 or N+1 of said averagers, whereby P=N−1 or N+1.

7. The analyzer defined in claim 1 wherein said second sampling means includes:
a. a digital comparator for providing said quantized digital samples of the second signal with respect to a reference signal,
b. reference signal generating means for generating a psuedoransom digital code having a uniform probability distribution over the full scale range of the second signal to be applied to said analyzer, said generating means being responsive to said second control means for stepping from one value of said code to the next in synchronism with sampling of said second signal, and
c. means for connecting said generating means to said comparator.

8. The analyzer defined in claim 1, including:
a. a digital comparator for providing said quantized digital samples of said second signal with respect to reference level,
b. a variable length shift register interposed between said comparator and the first-mentioned shift register for providing a selectable amount of precomputation delay prior to multiplication of said first and second signal samples, and
c. means coupling said variable length shift register to said second control means for shifting said quantized digital samples of said second signal at intervals $M\Delta\tau$.

9. The analyzer defined in claim 1, further including:
a. means for generating a ramp signal,
b. means for comparing the second signal with said ramp signal and providing said quantized digital samples indicating whether the second signal is greater or less than said ramp signal,
c. means for rendering said shift register ineffective and for applying signals corresponding to said quantized digital samples to said multiplication means output channels,
d. fifth control means coupled to the scanning means to effect intermittent connections of said separate averagers to said output channels in sequence whereby the averagers in the first set are connected sequentially, followed by those in the next set sequentially, through all sets, and
e. sixth control means coupled to said ramp signal generating means to effect one repetition of said ramp signal in synchronism with each complete sequence of connections by said scanning means.

10. The analyzer defined in claim 9, further including:

a. means for providing a constant-level reference signal ΔV and adding it to said ramp signal to form a sum signal;
b. second comparing means for comparing said second signal to said sum signal and providing quantized signal values indicating whether the second signal is greater or less than said sum signal;
c. an OR circuit responsive to both of said comparing means for providing said quantized digital samples indicating whether said second signal is within ΔV of said ramp signal; and
d. means for preventing application of said quantized digital samples from the first comparing means to said multiplication means output channels and applying thereto said quantized digital samples provided by said Or circuit.

11. The analyzer defined in claim 9 further including weighting means coupled to said timing control apparatus and responsive to said quantized digital samples provided by said comparing means for preventing application to said averagers of a predetermined fraction of those samples provided by said comparing means which indicate that the second signal is greater than or less than said ramp signal.

12. The analyzer defined in claim 1 further including
a. means coupled with said shift register for providing equal signal values thereto whereby said multiplying means output channels provide signal values proportional to said samples of the first input signal;
b. fifth control means coupled to the scanning means to effect connections of said averagers to said multiplying means output channels in a complete sequence whereby the averagers in the first set are connected sequentially, followed by those in the next set sequentially, and so on through all sets;
c. an auxiliary input for receiving a trigger signal;
d. means responsive to the auxiliary input and coupled to said fifth control means for effecting one complete scanning sequence following occurrence of a trigger signal at said auxiliary input and preventing another scan until occurrence of another trigger signal, and further including:
 1. variable delay means for delaying the starting of said scanning sequence by a selectable interval following occurrence of a trigger signal, and
 2. means for preventing said fifth control means from responding to a trigger signal occurring prior to completion of a scanning sequence.

13. The analyzer defined in claim 1 wherein each of said averagers comprises an input and an output; an averaging filter circuit consisting of a resistance coupled between the input and output, and an output capacitor coupled between the output and ground; and an input capacitor coupled between the input and ground and having a capacitance value much smaller than the output capacitor.

14. The analyzer defined in claim 13 wherein said timing control apparatus includes means for varying the rate of sampling of said signals and the rate of multiplying the samples thereof.

15. The analyzer defined in claim 13 wherein said timing control apparatus includes means for varying the dwell time during which each of said separate averagers is connected to said multiplying means output channels by said scanning means.

16. A system for analysis of first and second electrical signals, comprising:
a. A first sampling means for providing samples of the first signal,
b. a second sampling means for providing digital samples of the second signal, said second sampling means including a digital comparator for quantizing the second signal with respect to a reference level to provide said digital samples, a reference signal generating means for generating a pseudorandom digital code having a uniform probability distribution over the full scale range of the second signal to the applied to said system, and means for connecting said reference signal generating means to said digital comparator;
c. a multiplying means having one or more multiplication channels being coupled to said first and second sampling means for multiplying said digital samples by said samples from said first sampling means;
d. an averaging means including a plurality of signal averagers coupled to each of said multiplication channels; and
e. a timing control apparatus, including
 1. first control means coupled to the first sampling means to effect sampling of the first signal;
 2. second control means coupled to the second sampling means, said second control means further including means stepping said reference signal generating means from one value of said pseudorandom digital code to the next in synchronism with the sampling of said second signal.

* * * * *

PO-1050
(5/69)

UNITED STATES PATENT OFFICE
CERTIFICATE OF CORRECTION

Patent No. 3,626,168              Dated December 7, 1971

Inventor(s) Keith H. Norsworthy

It is certified that error appears in the above-identified patent and that said Letters Patent are hereby corrected as shown below:

Column 15, line 6, after "by" -- said -- should be inserted.

Column 16, line 19, delete "$\Phi$".

Signed and sealed this 10th day of October 1972.

(SEAL)
Attest:

EDWARD M. FLETCHER, JR.
Attesting Officer

ROBERT GOTTSCHALK
Commissioner of Patents